(12) United States Patent
Boyle

(10) Patent No.: US 12,601,188 B2
(45) Date of Patent: *Apr. 14, 2026

(54) SUPPORT PLATE FOR INSTALLING TILE

(71) Applicant: Laticrete International, Inc., Bethany, CT (US)

(72) Inventor: Sean P. Boyle, Rocky Hill, CT (US)

(73) Assignee: Laticrete International, Inc., Bethany, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,382

(22) Filed: Mar. 28, 2024

(65) Prior Publication Data

US 2024/0240472 A1 Jul. 18, 2024

Related U.S. Application Data

(63) Continuation of application No. 17/391,512, filed on Aug. 2, 2021, now Pat. No. 12,000,157, which is a
(Continued)

(51) Int. Cl.
*E04B 5/19* (2006.01)
*B32B 3/30* (2006.01)
(Continued)

(52) U.S. Cl.
CPC .............. *E04F 15/185* (2013.01); *B32B 3/30* (2013.01); *B32B 37/18* (2013.01); *B32B 38/0004* (2013.01); *B32B 38/04* (2013.01); *E04F 15/02044* (2013.01); *E04F 15/087* (2013.01); *E04F 15/182* (2013.01); *B32B 2038/045* (2013.01); *B32B 2471/00* (2013.01);

*E04B 5/19* (2013.01); *E04B 5/32* (2013.01); *E04B 5/326* (2013.01); *Y10T 156/1064* (2015.01);
(Continued)

(58) Field of Classification Search
CPC ......... E04F 15/16; E04F 15/12; E04F 15/166; E04F 15/163; E04F 13/04; E04B 5/326; E04B 5/18; E04B 5/19
See application file for complete search history.

(56) References Cited

U.S. PATENT DOCUMENTS

| | | | |
|---|---|---|---|
| 1,765,652 A | 6/1930 | Burgess | |
| 2,352,892 A | 7/1944 | Greulich | |

(Continued)

FOREIGN PATENT DOCUMENTS

| | | | | |
|---|---|---|---|---|
| JP | H06226889 A | * | 8/1994 | ............... B32B 3/12 |

*Primary Examiner* — Phi D A
(74) *Attorney, Agent, or Firm* — DeLio Peterson & Curcio LLC; Kelly M. Nowak

(57) ABSTRACT

A support for installing facing materials such as ceramic tiles on a substrate, such as, floors, walls and ceilings. The support plate has a plurality of spaced apart raised portions and recesses in the plate material, and a plurality of openings extending through the top surface and bottom surface of the plate material. The openings exposing a mat layer attached to the bottom of the support plate. Support plates of the invention are used for tile installations between a substrate and tile. Thin-set mortar that is used to secure the tile to the support plate flows into the recesses and into the openings forming a continuous bond between the mortar, openings and mat layer to provide a strong bond between the support plate, mortar and the tiles.

15 Claims, 11 Drawing Sheets

Related U.S. Application Data continuation of application No. 16/288,678, filed on Feb. 28, 2019, now Pat. No. 11,149,448, which is a continuation of application No. 15/911,703, filed on Mar. 5, 2018, now Pat. No. 10,597,879, which is a continuation of application No. 15/375,106, filed on Dec. 11, 2016, now Pat. No. 9,957,724, which is a continuation of application No. 14/670,827, filed on Mar. 27, 2015, now Pat. No. 9,518,396, which is a continuation of application No. 13/746,605, filed on Jan. 22, 2013, now Pat. No. 9,016,018.

(51) Int. Cl.

| *B32B 37/18* | (2006.01) |
|---|---|
| *B32B 38/00* | (2006.01) |
| *B32B 38/04* | (2006.01) |
| *E04B 5/32* | (2006.01) |
| *E04F 15/02* | (2006.01) |
| *E04F 15/08* | (2006.01) |
| *E04F 15/18* | (2006.01) |

(52) U.S. Cl.
CPC .................. *Y10T 428/24273* (2015.01); *Y10T 428/24331* (2015.01); *Y10T 428/24479* (2015.01); *Y10T 428/24612* (2015.01)

(56) References Cited

U.S. PATENT DOCUMENTS

| 2,353,398 A | 7/1944 | Greulich |
|---|---|---|
| 2,359,548 A | 10/1944 | Cushwa, Jr. et al. |
| 3,334,458 A | 8/1967 | Leemhuis |
| 3,469,509 A | 9/1969 | Hutchinson |
| 3,495,367 A | 2/1970 | Kobayashi |
| 3,507,634 A | 4/1970 | O'Driscoll |
| 3,509,800 A | 5/1970 | Kirkamp et al. |
| 3,802,790 A | 4/1974 | Blackburn |
| 4,128,982 A | 12/1978 | Weaver |
| 4,692,302 A | 9/1987 | DeMario et al. |
| 4,840,515 A | 6/1989 | Freese |
| 4,993,202 A | 2/1991 | Thiel |
| 5,052,161 A | 10/1991 | Whitacre |
| 5,105,595 A * | 4/1992 | Tokei .......................... E04B 5/48 |
| | | 52/169.5 |
| 5,108,222 A | 4/1992 | Jansson et al. |
| 5,255,482 A | 10/1993 | Whitacre |
| 5,399,406 A | 3/1995 | Matsuo et al. |
| 5,406,745 A | 4/1995 | Lin |
| 5,456,966 A | 10/1995 | Austin |
| 5,460,867 A * | 10/1995 | Magnuson ............ E01C 13/083 |
| | | 405/38 |
| 6,151,854 A | 11/2000 | Gutjahr |
| 6,286,279 B1 | 9/2001 | Bean et al. |
| 6,434,901 B1 | 8/2002 | Schluter |
| 6,681,907 B2 | 1/2004 | Le |
| 7,048,469 B1 | 5/2006 | Jansson |
| 7,182,548 B1 * | 2/2007 | Womack .................. E01C 11/24 |
| | | 428/595 |
| 7,585,556 B2 | 9/2009 | Julton |
| 7,644,745 B2 | 1/2010 | Le et al. |
| 7,771,817 B2 | 8/2010 | Grimble et al. |
| 7,815,395 B1 | 10/2010 | Blackwood |
| 7,950,191 B2 | 5/2011 | Brouwers |
| 8,280,340 B2 | 10/2012 | Xuan et al. |
| 8,608,401 B2 | 12/2013 | Gooden |
| 8,734,049 B1 | 5/2014 | Stiles |
| 9,010,618 B2 | 4/2015 | Boyle |
| 9,090,288 B2 | 7/2015 | Takahashi |
| 9,670,624 B1 | 6/2017 | Stiles |
| 9,909,266 B1 | 3/2018 | Stiles |
| 10,537,149 B2 | 1/2020 | Cormier et al. |
| 10,562,478 B2 | 2/2020 | Tyan et al. |
| 10,676,874 B2 | 6/2020 | Siao et al. |
| 10,829,070 B2 | 11/2020 | Tyan et al. |
| 2002/0124506 A1 | 9/2002 | Mercade |
| 2003/0082359 A1 | 5/2003 | Scott |
| 2003/0156905 A1 * | 8/2003 | Hubert .................... E02D 31/02 |
| | | 405/229 |
| 2005/0016097 A1 * | 1/2005 | Janesky ................ E04F 15/105 |
| | | 52/384 |
| 2006/0201092 A1 * | 9/2006 | Saathoff .................. E04F 13/00 |
| | | 52/385 |
| 2008/0203749 A1 | 8/2008 | Tamada |
| 2011/0047907 A1 | 3/2011 | Smolka et al. |
| 2012/0213972 A1 * | 8/2012 | Sanderson ............. B60N 3/048 |
| | | 428/156 |
| 2016/0123021 A1 | 5/2016 | Cormier et al. |

* cited by examiner

SUPPORT PLATE FOR INSTALLING TILE

BACKGROUND OF THE INVENTION

1. Field of the Invention

This invention relates to facing materials such as ceramic tiles which are installed over substrates such as floors, ceilings and walls using a support plate or decoupling mat between the substrate and the facing material to minimize or eliminate stresses which may cause cracking or detachment of the facing material from the substrate.

2. Description of Related Art

The use of facing materials, such as, ceramic tiles are well known to provide an aesthetically pleasing appearance as well as durability and wear resistance. The following description will be directed to ceramic tiles for convenience although it should be appreciated by those skilled in the art that other facing materials such as stone flooring, granite, slate, plastics, and the like, may be employed with the support plate of the invention.

In general, ceramic tile is installed over a substrate such as a wooden floor using a mortar to set the tile. Unfortunately, because of the differences in properties between the substrate, mortar, and ceramic tile, stresses formed during such installation often result in damage in the form of cracks or delamination. Previously, most ceramic tile installations utilized mud setting beds, wherein a mixture of sand and cement was applied over the floor or other substrate and the ceramic tile set in the mud. The mud beds were generally in the range of about 1½ inches thick.

Modern ceramic tile installations now often use thin layer processes, which require use of thin-set mortar systems wherein the thickness of the thin-set mortar is about ½ inch thick. Flooring systems of this type are generally less costly, lighter, and more easily coordinated with installations of ceramic tile and stone.

Because of the thinness of the installation however, stresses at the interface between the mortar, substrate, and ceramic tile are much greater than in the case of a thin bed installation and it has been found that these stresses cause cracking of the tile and/or delamination of the tile of the floor. In an effort to decrease the stress differences and the problems of tile cracking and delamination, support plates or otherwise known as decoupling or uncoupling plates/mats have been developed. Currently available support plates are used between the substrate and the ceramic or stone tile to provide a base for the tile, as well as to decrease or eliminate the stresses in the installation. A number of support plates have been developed as indicated in the following patents.

U.S. Pat. No. 4,917,933 discloses a plastic sheet that is used as a sub-carrier and provides a series of parallel, alternating, dovetailed-shaped channels and grooves. A cross-meshed lattice matting, having filaments, is glued or partially fused to the backside of the plastic sheet and serves to anchor the sheet to the underlying foundation.

In U.S. Pat. No. 5,255,482 a support plate is used between a rigid horizontal base and a top flooring layer (i.e., tile). The support plate is a crack isolation layer that comprises a hard, essentially rigid material that is in load bearing relationship with the base and the top flooring layer. The crack isolation layer comprises precast rigid crack isolation sheets having recesses or holes. Alternatively, the crack isolation layer comprises a plurality of spaced pilings of rigid, non-compressible material, which are mounted in spaced apart relationship on a cloth matting.

U.S. Pat. No. 6,434,901 shows another support plate of a sheet material having a number of recesses therein. Each recess within this support plate has overhangs that define undercut portions therein that entrap mortar in the recess and provide a secure bond between a ceramic tile and the support plate. The support plate is positioned on the substrate and secured thereto, and then thin-set mortar is applied to the surface of the support plate and fills the recesses within such plate.

In UK Patent Application GB 2141459, a drainage plate is shown having stamped-out portions recessed on one side of the plate with u-shaped openings provided in the inclined laterals walls of the recessed portions to permit water to pass there-through. The drainage plate is installed between the substrate and the ceramic tile.

In U.S. Pat. No. 7,536,835 a support plate having support elements that are hollow towards the underside, capable of support, and project out beyond the top of the support plate, is applied on the sub-floor. Channels carrying open water are formed between the support elements and a water-permeable covering that is disposed on the support elements. The support plate is embedded in a thin-bed mortar layer on the sub floor, and ceramic tiles are laid and attached to a covering (non-woven fabric) residing on the other side of the support plate.

In U.S. Publication Application No. US/200610201092, another support plate is shown for achieving a coupling between the base and a surface cladding. This support plate has multiple open chambers with a net-like fabric attached at the open end of such chamber. A thin-set mortar is applied over the support plate to fill the chambers and secure the mortar to the plate via the net-like fabric for attaching the support plate to the ceramic tile.

Unfortunately, while the prior art has developed a number of support plates to be used in ceramic and stone tile installations, each of these prior art support plates continues to introduce some level or degree of unwanted stress cracking and/or delamination. As such, there is still a need for improved support plates that decrease and/or avoid stress cracking of the tiles, while also decreasing and/or avoiding delamination of the tiles caused by stresses resulting in the installation.

SUMMARY OF THE INVENTION

Bearing in mind the problems and deficiencies of the prior art, it is therefore an object of the present invention to provide a support plate for installing facing materials such as ceramic and stone tiles on substrates such as floors, ceilings and walls wherein the support plate minimizes and/or eliminates stresses which may cause cracking or detachment of the set tile.

It is another object of the present invention to provide a flooring installation wherein facing materials, such as, ceramic and stone tiles, are installed over a substrate, such as, floors and ceilings, wherein a support or decoupling plate is used between the substrate and the ceramic or stone tile to minimize and/or eliminate stresses which may cause cracking or detachment of the set tile to the substrate.

In one or more embodiments, the invention is directed to a support plate for installing facing materials on a substrate. The support plate includes a sheet material having a top surface and a bottom surface; an underlay mat of non-woven fabric material having a first side bonded to the bottom surface of the sheet material and a second side that comprises only the non-woven fabric material of the underlay mat, a plurality of openings residing in the sheet material extending through the sheet material and exposing the underlay mat; and a plurality of spaced apart adjacent raised portions and recesses of the sheet material residing across the support plate. Whereby together the sheet material, the bonded underlay mat, the plurality of openings, and the plurality of spaced apart adjacent raised portions and recesses comprise a support plate ready for use in installing facing materials on the substrate.

In other embodiments, the invention is directed to a support plate for installing tile on a substrate. The support plate includes a sheet material having a top surface and a bottom surface, and a plurality of circular recesses spaced apart from a plurality of adjacent flared-square recesses. These circular and flared-square recesses reside across the sheet material and have bottom and sidewalls comprising the sheet material. Together the sheet material and the circular and flared-square recesses define a plate having a thickness extending from a top surface to a bottom surface thereof. The support plate also includes an underlay mat attached to the bottom surface of the plate. A plurality of open slots traverse through the sheet material at the top surface of the plate and expose a top surface of the underlay mat. These plurality of open slots reside between and connect at least one circular recess to an adjacent at least one flared-square recess.

In still other embodiments, the invention is directed to a method of installing facing materials. The method includes providing a substrate, and depositing a first mortar over the substrate followed by attaching a support plate to the substrate via the first mortar. The support plate includes a sheet material having a top surface and a bottom surface, and a plurality of adjacent recesses residing across the sheet material. Together the sheet material and the recesses define a plate having a thickness extending from a top surface of the plate to a bottom surface of the plate. The support plate also includes an underlay mat attached to the bottom surface of the plate. A plurality of slots traverse through the sheet material at the top surface of the plate and reside between the adjacent recesses. A second mortar is then deposited over the support plate to fill both the plurality of recesses and the plurality of slots. This second mortar residing within the plurality of slots contacts the second mortar residing within the plurality of recesses. A facing material is then provided over the second mortar.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

4

FIGS. 3A-3E are top plan and cross-sectional perspective views showing an installation system of various embodiments of the invention using the support plate shown in FIGS. 2A-2E.

Figures 4A, 4B, 4C, 4D:
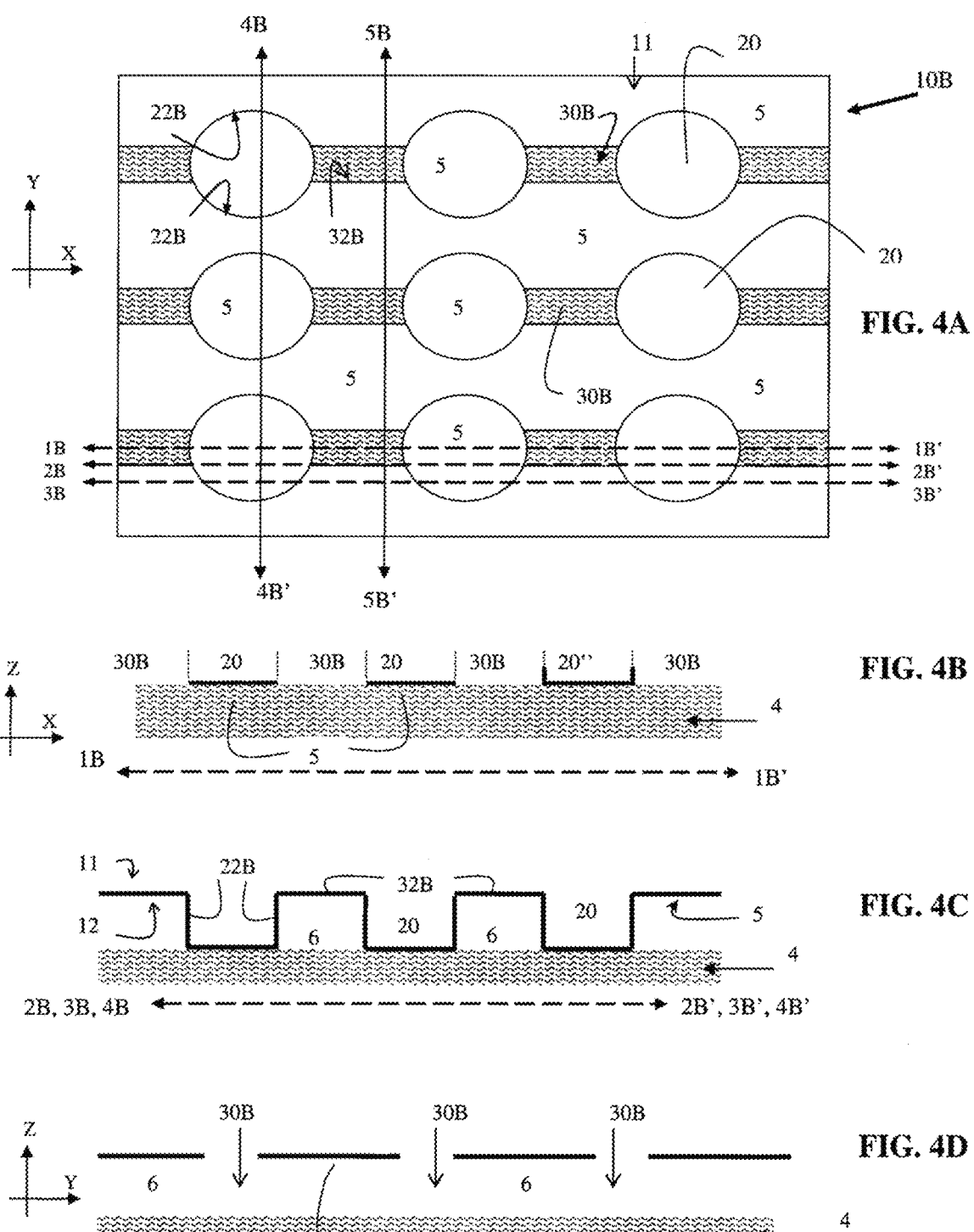

FIG. 4A is a top plan view of another support plate of other embodiments of the invention.

FIGS. 4B-4D are cross-sectional perspective views of the support plate of FIG. 4A taken along the various lines therein.

FIGS. 5A-5D are top plan and cross-sectional perspective views showing an installation system of one or more embodiments of the invention using the support plate shown in FIGS. 4A-4D.

FIGS. 6A-6G are top plan views showing various configurations and paths that interconnecting slots of the invention may reside across the different support plates of the invention.

Figure 7A:
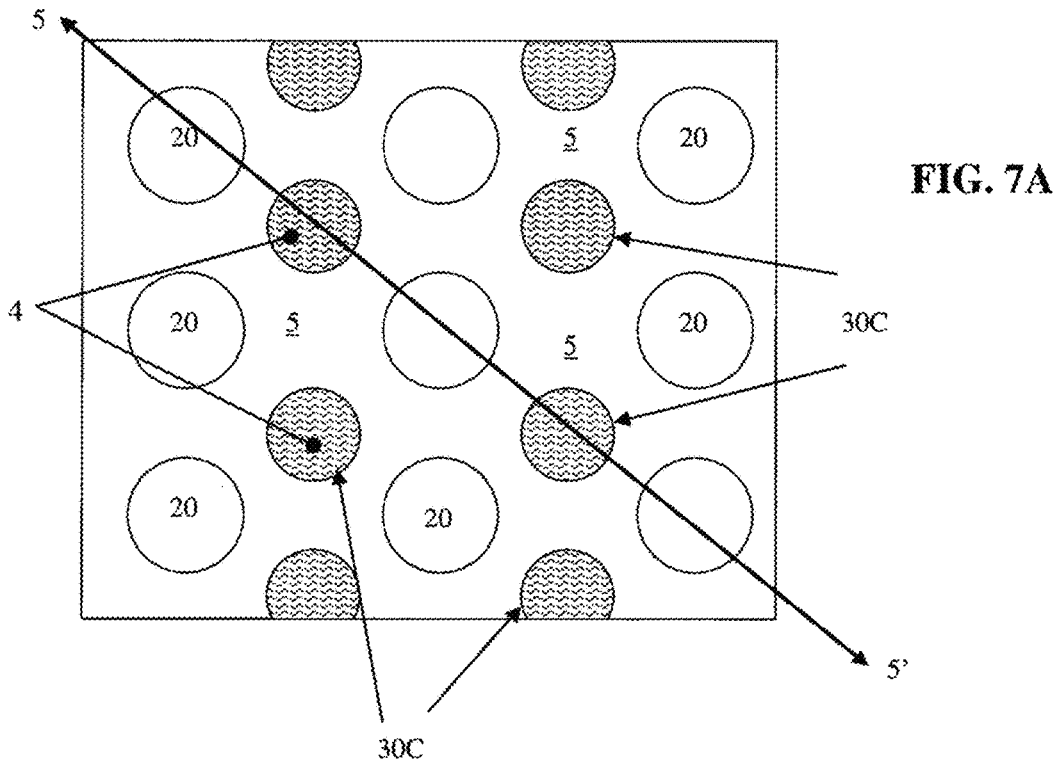
Figure 7B:
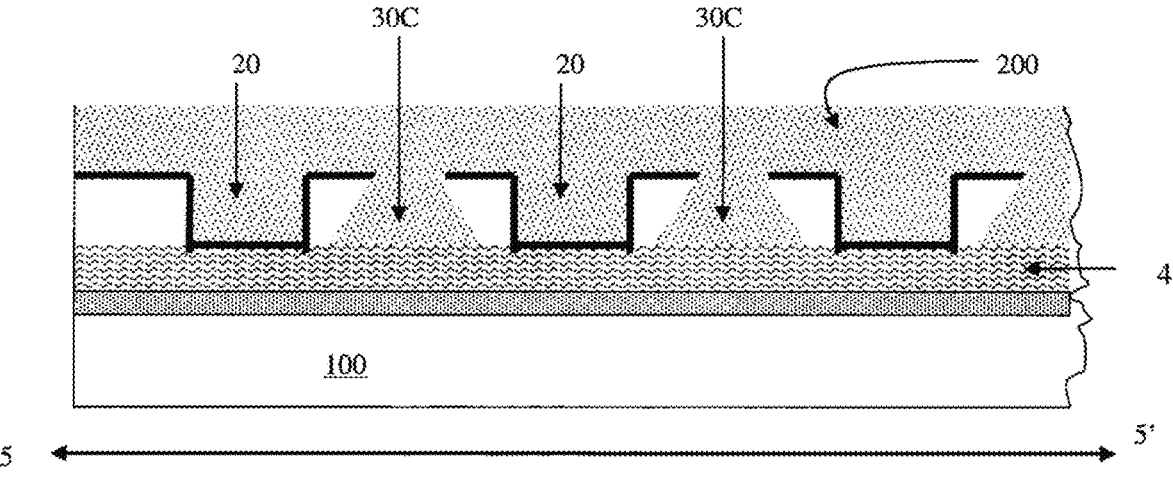
Figure 8A:
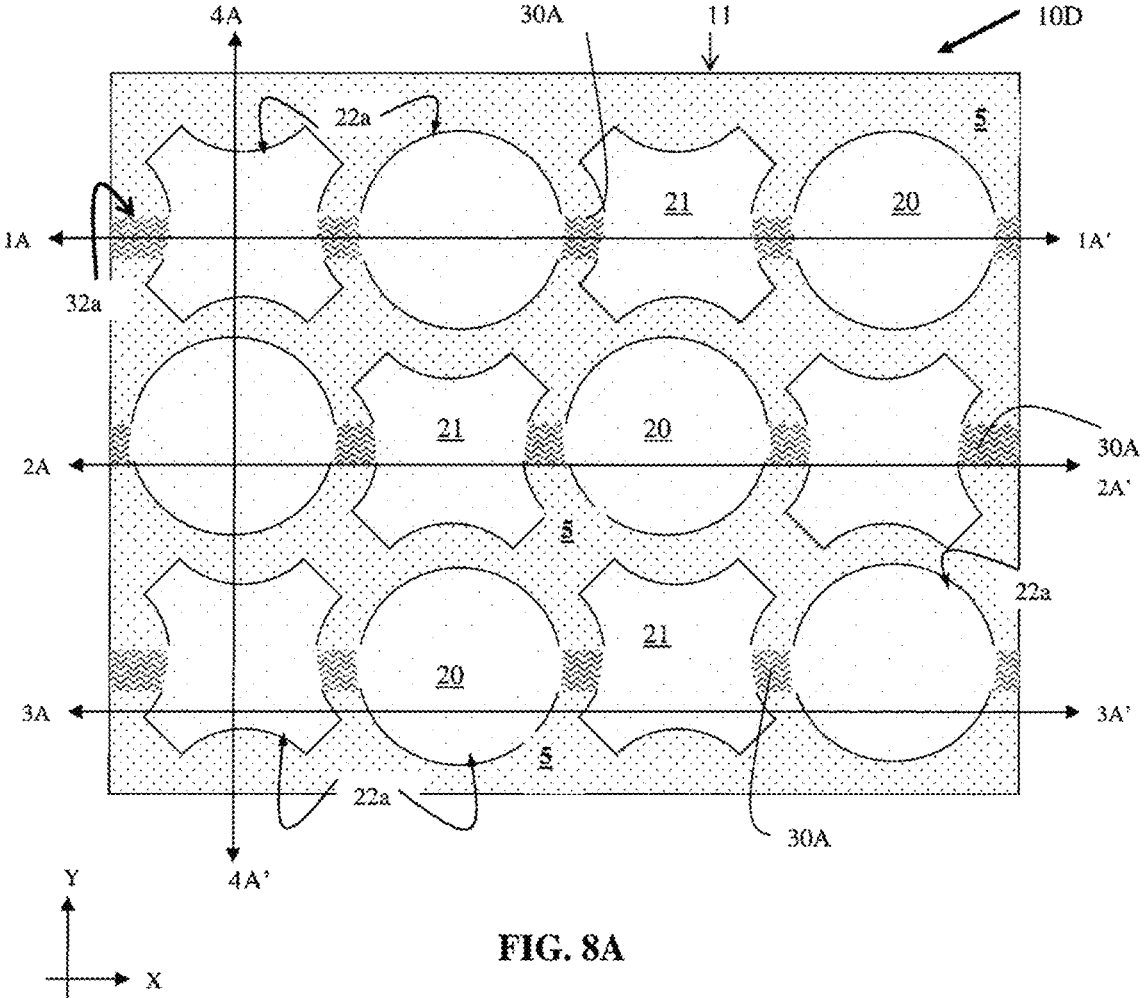

FIGS. 7A-7B are top plan and cross-sectional perspective views of other slots of the invention residing across the present support plates.

FIGS. 8A-9B show support plates in accordance with one or more embodiments of the invention having different shaped recesses connected or adjoined together by open slots residing across the planar upper surface of the present support plates.

DESCRIPTION OF THE PREFERRED EMBODIMENT(S)

In describing the preferred embodiment of the present invention, reference will be made herein to FIGS. 1-9B of the drawings in which like numerals refer to like features of the invention.

Figures 1A, 1B, 2A:
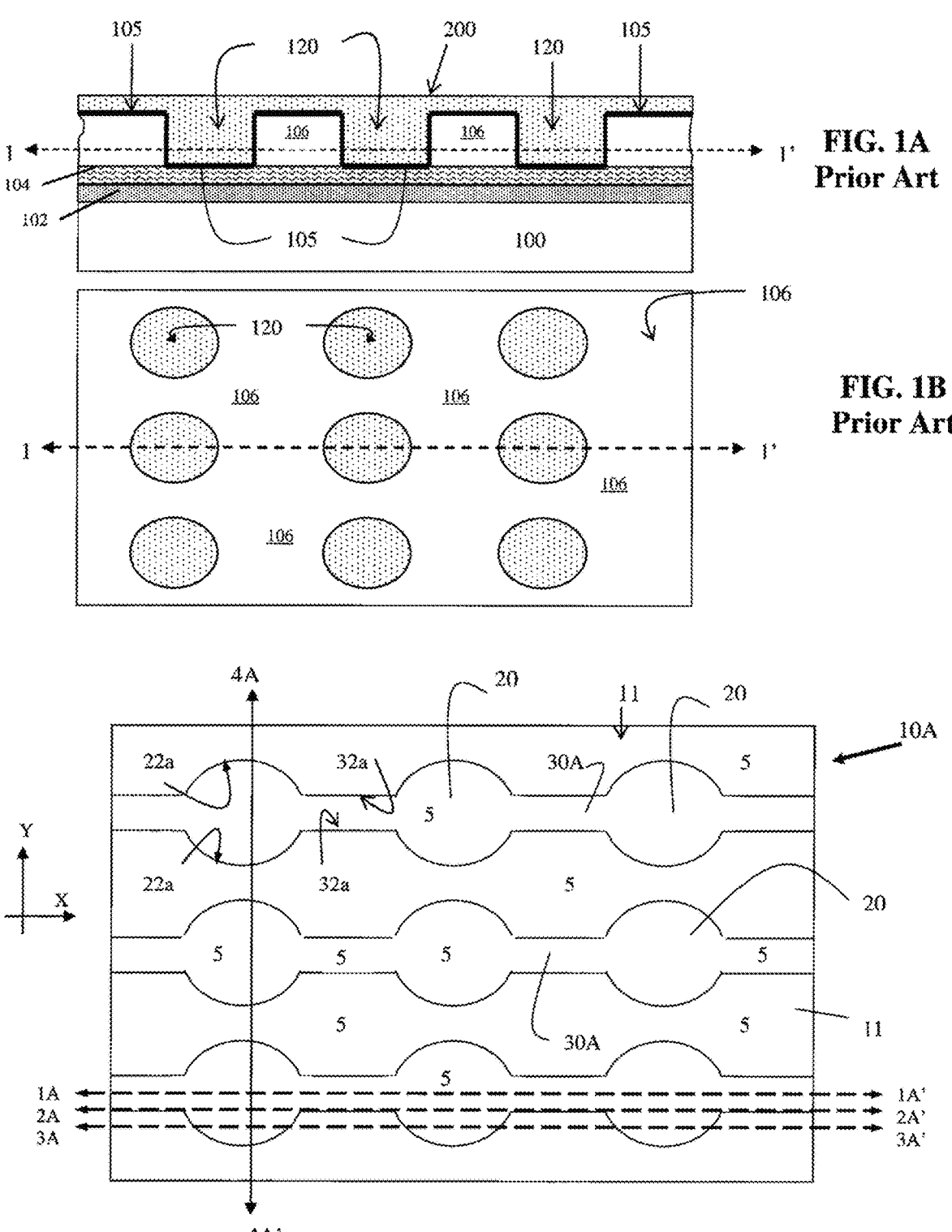
FIG. 1A is a cross-sectional view of a prior art support plate secured to a substrate.
FIG. 1B is a top plan view of the support plate of FIG. 1A taken along line 1-1' of FIG. 1A.
FIG. 2A is a top plan view of a support plate in accordance with one or more embodiments of the invention.

Referring to the drawings, FIGS. 1A and 1B show a conventional prior art support plate 105, such as, those described above. The support plate 105 is installed over a substrate 100, such as a floor, using mortar 102. The support plate 105 is a sheet of plastic material having a number of recesses 120 formed across and within the support plate. Each recess 120 has sidewalls and a bottom wall composed of the support plate material. Raised portions of the support plate material reside between the recesses 120 with empty cavity regions 106 residing under the raised portions of the support plate.

Attached to the bottom of the support plate 105 is a fabric-like mat 104. In attaching the support plate 105 to the substrate 100, the mortar 102 residing over the substrate 100 impregnates the fabric-like mat 104 to secure the support plate to the substrate. A thin-set mortar 200 is then applied over the support plate 105 to provide a base for the installation of tiles and grout over the support plate (not shown).

As shown from the side view of FIG. 1A, and the top plan view of FIG. 1B (along line 1-1' of FIG. 1A), the thin-set mortar 200 fills only the recesses 120 and contacts the sidewalls and bottoms of such recesses. Since the support plate material resides over the empty cavity regions 106, which reside under or at a backside of the support plate, the thin-set mortar 200 does not penetrate, contact or fill such empty cavity regions 106. As such, the fabric-like mat 104 that is exposed within these empty cavity regions 106 (see, FIG. 1B) does not contact the thin-set mortar 200.

These empty cavity regions 106 of the plate are not as strong under pressure as compared to those sections of the plate filled with thin-set mortar 200 (e.g., the recesses 120 filled with mortar 200). As such, the empty cavity regions 106 impart weak and less durable portions of the conventional support plate 105 that allow for movement in and of the laid support plate, which in turn, may induce stress cracking and/or delamination of the tiles and/or grout residing on top of the thin-set mortar 200.

Unlike that of the conventional prior art support plates 105 shown in FIGS. 1A-B, the support plates of the present invention improve the durability of the laid support plate to decrease and/or avoid stress cracking and/or delamination in facing materials (e.g., tiles on substrates such as floors, ceilings, walls, etc.) and in the mortars used to lay such facing materials. FIGS. 2A-9B show one or more embodiments of support plates of the invention. Again, while the present invention is described generally in connection with ceramic tiles for ease of understanding the invention, it should be appreciated by those skilled in the art that other facing materials, such as, stone flooring (tile), granite, slate, plastics, and the like, may be employed with the various support plates of the invention. It should also be appreciated that while reference is made herein to a support plate, the various support plates of the invention may also be referred to as a decoupling plate/mat/or membrane, uncoupling plate/mat/or membrane, support mat/or membrane, underlayment, and the like.

Referring to FIGS. 2A-2E, a support plate in accordance with one or more embodiments of the invention is shown generally as numeral 10A. The support plate is made of a material 5 (i.e., a base material 5), such as a foil-like plastic material, and has a first side being a top surface 11 and a second side being a bottom surface 12. The support plate may be composed of a high-density polyethylene or polypropylene plastic material. FIG. 2A shows a top plan view of the support plate 10A having a number of recesses 20 formed across the support plate 10A. Since the recesses 20 are formed in the sheet material 5 of the plate 10, such recesses have a similar sidewall thickness and base thickness as that of the material 5.

The support plates of the invention are in communication with and/or attached to an underlying fabric-like mat 4. The underlying mat 4 may be bonded, adhered to, or attached to one of the sides of the support plate material 5 of the various support plates of the invention. The underlying mat 4 may include a non-woven fabric material, a woven fabric material, and the like. In one or more embodiments the underlying mat 4 may be composed of a polypropylene spun bond fabric.

Residing across the support plate 10A is a number of slots 30A that provide increased durability to the present laid support plate. Referring to one or more embodiments of the invention, adjacent recesses 20 may be connected to each other along one or more planes by slots 30A. For instance, FIG. 2A shows adjacent recesses 20 adjoined together by slots 30A along an x-plane. However, it should be appreciated that the adjacent recesses may be adjoined along the y-plane, adjoined along both the x-plane and y-plane, or even at scattered locations across the x-, y-planes.

While the slots 30A are shown in FIG. 2A as recessed slots that adjoin adjacent recesses 20 along a single path (e.g., row, column, etc.), it should be appreciated and understood that in certain embodiments of the invention, as discussed in detail below, the slots are open slots 30B that connect adjacent recesses 20 while simultaneously exposing underlying fabric-like mat 4. Still further discussed below, in other embodiments the slots may be openings 30 that do not connect adjacent recesses 20, but rather provide an opening within the material 5 of the support place 10A to expose the underlying fabric-like mat 4.

Referring again, to FIG. 2A, while the slots 30A are shown as recessed slots that adjoin adjacent recesses 20 along a single path (e.g., row, column, etc.), it should be appreciated and understood that such slots 30A may have any shape, and reside along any path, that allow for two or more recesses to be joined together. For instance, while not meant to limit the invention, the slots 30A may be L-shaped, X-shaped, H-shaped, C-shaped, T-shaped, square-shaped, rectangular, circular, triangular, or any other geometric or polynomial shape that allows for two, three, four or more recesses to be connected together, regardless of whether each and all the connected recesses are adjacent to one another. It should further be appreciated that in certain embodiments, as discussed further below in relation to FIGS. 7A-7B, the slots 30A in the present support plates need not adjoin adjacent recesses.

Referring to FIGS. 2B-E, cross-sectional perspective views of a support plate of the invention is shown along lines 1A-1A', 2A-2A', 3A-3A' and 4A-4A' of FIG. 2A, respectively. In one or more embodiments, the material 5 of the support plate resides at the top surface 11 of the support plate 10A, along sidewalls 22A of recesses 20, at the bottom of recesses 20, and may even reside along sidewalls 32A of slots 30A, and at the bottom of slots 30A.

In other embodiments of the invention, as discussed in detail below in reference to FIGS. 4A-9B, the material 5 of the support plate does not reside along the sidewalls 32A of openings nor at the bottom thereof. Rather, in these embodiments the slots 30A are open slots that traverse through the material 5 of the support plate 10B to form apertures therein and expose the underlying fabric-like mat 4 of the plate.

FIGS. 2A-3E show embodiments of the invention wherein the present support plates 10A may have material 5 of the plate extending across the entire support plate (i.e., having no open voids that expose the underlying fabric-like mat 4 as in FIGS. 4A-9B). In the embodiments shown in FIGS. 2A-3E the slots 30A are recessed (i.e., recessed slots) and both adjoin and physically connect two or more recesses 20 to each other, whether such recesses are adjacent to one another or not.

Figure 2B:
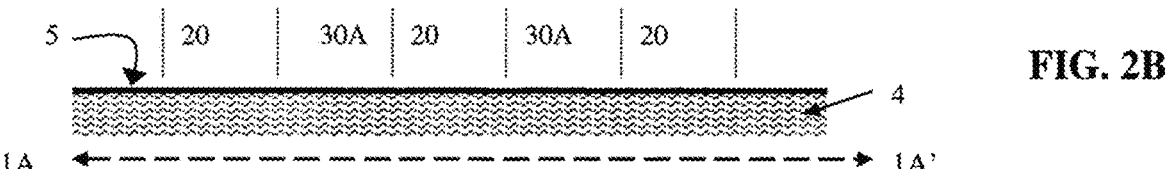
FIGS. 2B-2E are cross-sectional perspective views of the support plate of FIG. 2A taken along the various lines therein.
Figure 2C:
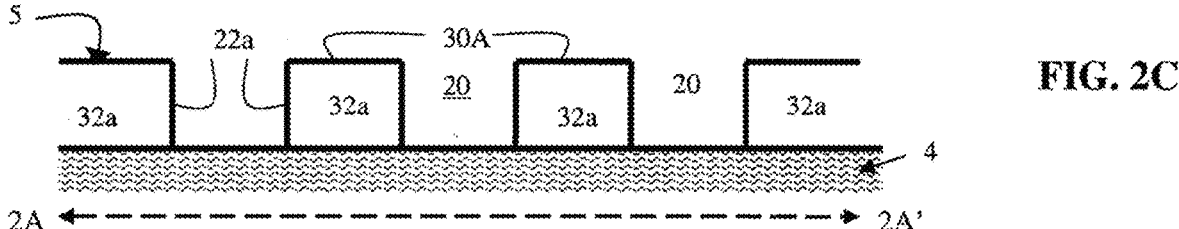

FIG. 2B shows that along line 1A-1A', which is substantially at the center of the recesses 20 and adjoining slots 30A, the support plate material 5 extends across all bottoms of the recesses 20 and slots 30A. FIG. 2C shows portions of the sidewalls 32*a* of slots 30A, portions of sidewalls 22*a* of recesses 20, as well as the support plate material 5 residing at the bottoms of such recesses 20 and slots 30A along line 1B-1B' of FIG. 2A.

Figure 2D:
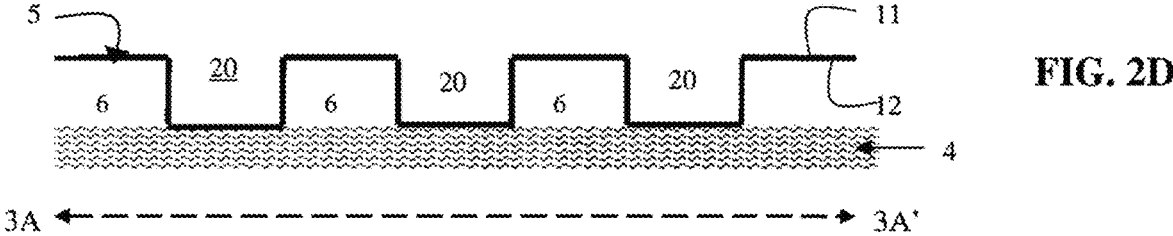

Referring to FIG. 2D, it is shown that the plate material 5 resides across the entire support plate 10A with regions where the recesses 20, their sidewalls 22A and recess bottoms, as well as regions where the slots 30A, their sidewalls 32A and their bottoms, all have the support plate material 5. In particular, FIG. 2D shows a perspective view along line 3A-3A' in the x-direction whereby the material 5 of the plate resides at the top surface 11 of the plate and within all portions of the recesses 20. The empty cavity regions 6 are shown residing between adjacent recesses 20.

Figure 2E:
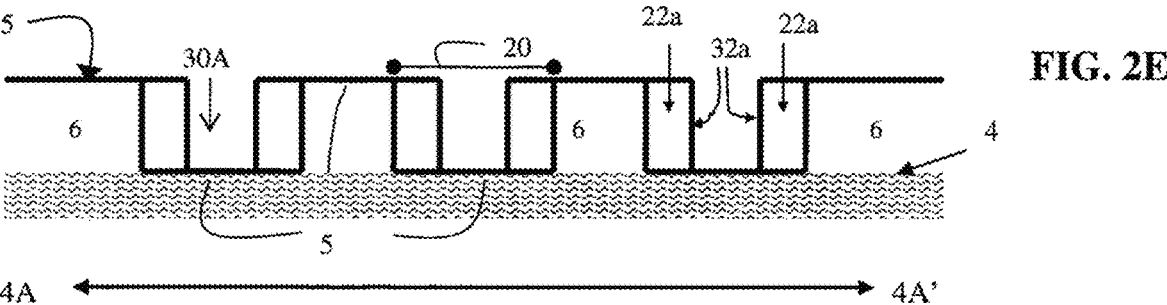

FIG. 2E shows a perspective view along line 4A-4A' in the y-direction whereby the material of the plate resides across its top surface 11, within the recesses as shown by the portions of recess sidewalls 22A, and within slots 30A along the openings sidewalls 32A and bottom surface. As shown, the slots 30A have a narrower width as compared to a width of the recesses 20 formed in the plate 5. Again, as will be understood in accordance with the description of the present invention, these recessed slots of these embodiments of the invention may connect two, three, four or more recesses 20 within the plate 5.

FIGS. 3A-3E show a method of installing the support plate of FIGS. 2A-E over an adhesive or mortar 102 (e.g., a cementitious mortar) to secure the plate to a substrate 100 including, for instance, a floor, ceiling, wall, angled surface, etc. In doing so, the adhesive or mortar 102 is deposited over the substrate 100 followed by providing the support plate 10A of the invention over the mortar 102 and pressing the plate into place within the mortar 102. The fabric-like mat 4 at the underside 12 of the plate maximizes bonding of the support plate 10A to the substrate 100 via the mortar 102. A thin-set mortar 200 is then applied over the support plate 10A to provide a base for the installation of facing materials 300 and grout 310 thereover.

Figures 3A, 3B, 3C, 3D, 3E:
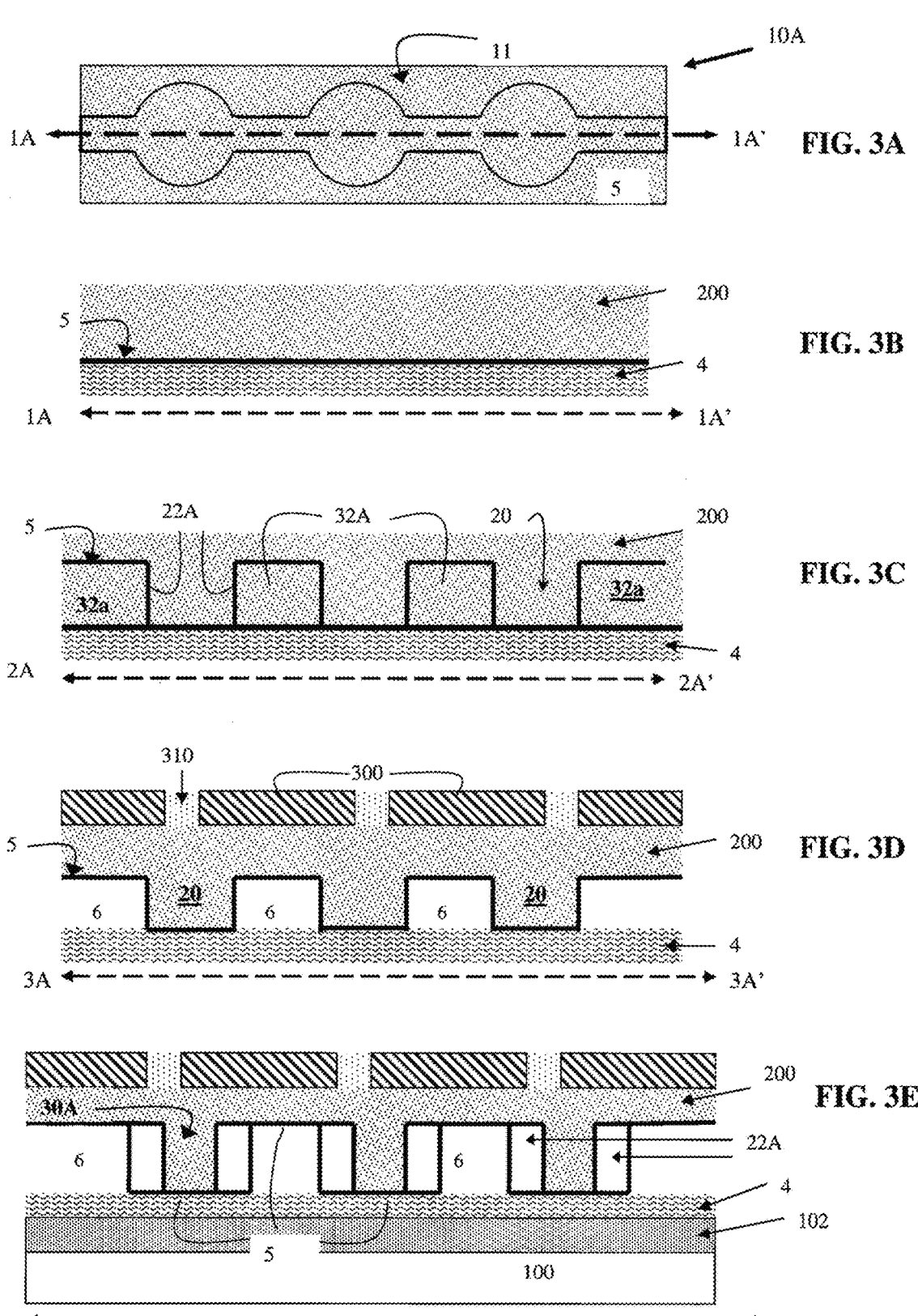

FIGS. 3A-B show that the mortar 200 completely fills both recesses 20 and slots 30A, and contacts the material 5 of the support plate at the bottom of such recesses and openings. FIGS. 3C-E show alternate views of the mortar filled support plate of these embodiments of the invention. As is shown, the mortar 200 entirely fills the recesses 20 and slots 30A, making contact with recess sidewalls 22A, recess bottoms, opening sidewalls 32A and opening bottoms, and completely covers the top surface 11 of the plate.

In those embodiments of the invention having recessed slots 30A, such recessed slots provide additional exposed support plate surface areas that the mortar 200 contacts, and they decrease the area of empty cavity regions 6 residing between the support plate 10A and substrate 100 while maintaining sufficient separation between such substrate and facing materials. As a result, the recessed slots 30A of the invention provide increased durability and strength to the present support plates 10A. This increased durability and strength leads to reduced stress cracking and delamination of facing materials and/or grout residing over such plates. The mortar within the recessed slots 30A also provides increased or enhanced mechanical bond of facing materials to the mortar 200 to the plate 10A.

Referring to other embodiments of the invention, FIGS. 4A-5D show one or more embodiments of support plates of the invention as described in detail below. In these embodiments of the invention, each support plate 10B is composed of a material S (e.g., a foil-like plastic material), and has top surface 11 and bottom surface 12. The top plan view of FIG. 4A shows the support plate 10B having a number of recesses 20, each with the support plate material 5 residing along the recess sidewalls 22B and bottoms thereof. The support plate 10B also has a number of open slots 30B that traverse through the support plate material 5 and expose the underlying fabric-like mat 4 that is in communication with and/or bonded, adhered or attached to the support plate material 5 to form support plate 10B.

The open slots 30B provide increased durability to the present laid support plate 10B and decrease both cracking and delamination problems. These open slots 30B may be provided within the present support plates 10B by a variety of known techniques including, but not limited to, cutting openings within the plate, stamping or punching openings within the plate, molding a plate having such openings, and the like. These support plates 10B have a number of open slots 30B that do not have bottoms and thereby expose the underlying mat 4 of the plate. The open slots 30B exposing the underlying mat 4 material may either contact and connect adjacent recesses 20 to each other (see, e.g., FIGS. 4A-5D), or they may reside between adjacent recesses 20 and not contact any of such recesses (see, e.g., FIGS. 7A-7B).

In one or more embodiments, the open slots 30B may have no bottoms or sidewalls. Rather, they are provided as cuts or openings within the support plate material 5 to expose the underlying mat material 4. In other embodiments, the support plates may be fabricated with the open slots 30B whereby such slots 30B are open at the bottom (i.e., have no bottoms) but have sidewalls that define a pillar column that is to be formed upon application of a thin-set mortar. In these embodiments, the sidewalls may be provided to form a conical, tubular or other trapezoidal shape, all of which have no bottom material (mat 4 is exposed) that is capable of being filled with mortar. These sidewalls may be either straight sidewalls, or they may be transverse or angled sidewalls to form transverse or angled open slots 30B. In each of these embodiments of the invention the slots 30B at least expose the underlying mat 4 to provide a strong interlocking bonding connection between the mat 4, mortar 200 provided over the support plate, the support plate itself, and facing material (e.g., tile) provided over the mortar 200 and support plate.

Again, it should be appreciated that the openings within the support plates of the invention may be open slots 30B of any shape or size, and reside along any path, that allow for two or more recesses to be joined together. For instance, the open slots 30B may be L-shaped, X-shaped, H-shaped, C-shaped, T-shaped, square, rectangular, circular, triangular, or any other geometric or polynomial shape, or even combinations thereof (see, e.g., FIGS. 6A-6D), that allows for two, three, four or more recesses to be connected together, regardless of whether each and all the connected recesses are adjacent to one another. In one or more support plates of the invention, a combination of slots (i.e., recessed slots or open slots) may be provided that connect one or more recesses together in combination with openings residing between and not contacting any recesses.

Referring to FIGS. 4B-D, support plate 10B is shown respectively along lines 1B-1B', 2B-2B', 3B-3B' and 4B-4B' of FIG. 4A. As is shown, the open slots 30B form apertures or voids in the support plate material 5 and expose the underlying mat 4 at those portions of the plate 10B where such open slots 30B reside. FIG. 4B shows a perspective view of the plate 10B along line 1B-1B' in the x-direction. The open slots 30B traverse through the plate material 5, such that, the plate material 5 resides only at the bottoms of the recesses along line 1B-1B' as is shown by reference numerals 20. Alternatively, as shown by reference numeral 20'' in FIG. 4B, the open slots 30B may traverse through the raised portion of the support plate 10B and partially into the sidewall 22B of the recess 20''. In this manner a portion of the recess 20'' sidewall may remain within the support plate 10B.

FIG. 4C shows a perspective view in the x-direction along lines 2B-2B' and 3B-3B'. As shown, the open slots 30B are provided or formed in the support plate 10B such that they have sidewalls 32B having a length that is substantially equivalent to the thickness of the support plate material 5 itself. A perspective view in the y-direction along line 4B-4B' is also shown in FIG. 4C (however, the sidewall portion 22B of recesses 20 is not shown). Again, the plate material 5 resides across the raised protruding portions of the plate 10B and within the recesses 20. Referring to FIG. 4D, a perspective view in the y-direction along line 5B-5B' is shown. This line 5B-5B' resides across the plate 10B and across the open slots 30B. The material 5 of the plate does not reside in locations where open slots 30B reside, such that, an upper surface of the underlying mat 4 material is exposed.

FIGS. 5A-D show a method of installing the support plate 10B of FIGS. 4A-D over adhesive or mortar 102 to secure the plate to a substrate 100 including, for instance, a floor, ceiling, wall, angled surface, etc. The support plate is secured to the substrate 100 by adhesive or mortar 102 impregnating and adhering to the mat 4 of the plate 10B as described above. A thin-set mortar 200 is then applied over the support plate 10B to provide a base for the installation of facing materials 300 and grout 310. The mortar 200 is pressed into and completely fills the recesses 20 and open slots 30B.

Figure 5A:
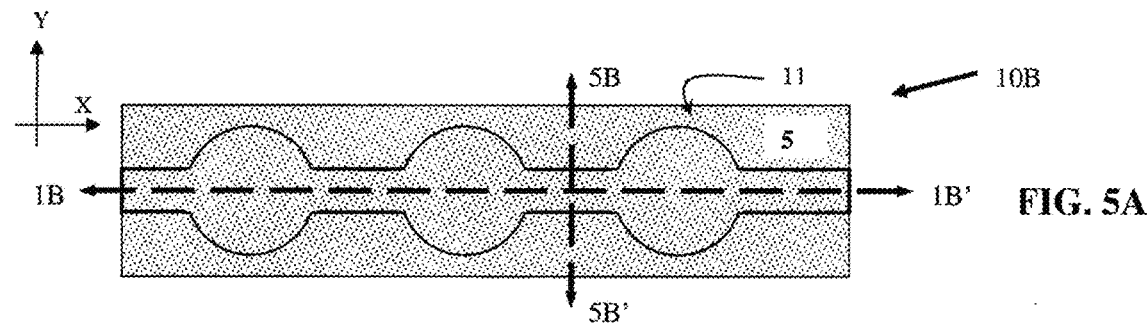
Figure 5B:
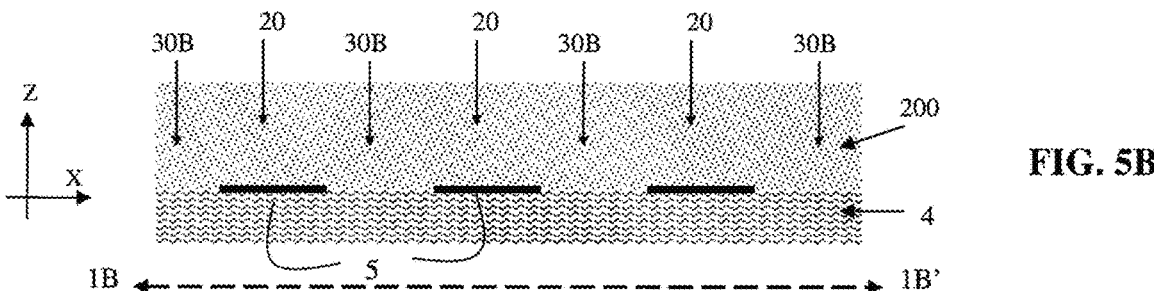
Figure 5C:
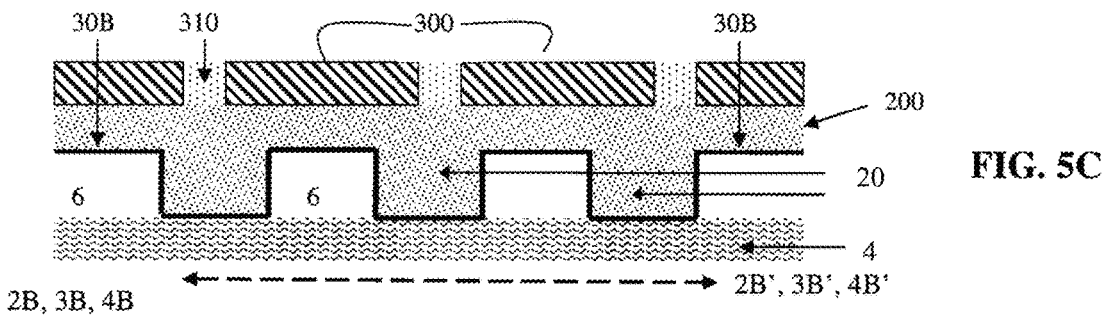
Figure 5D:
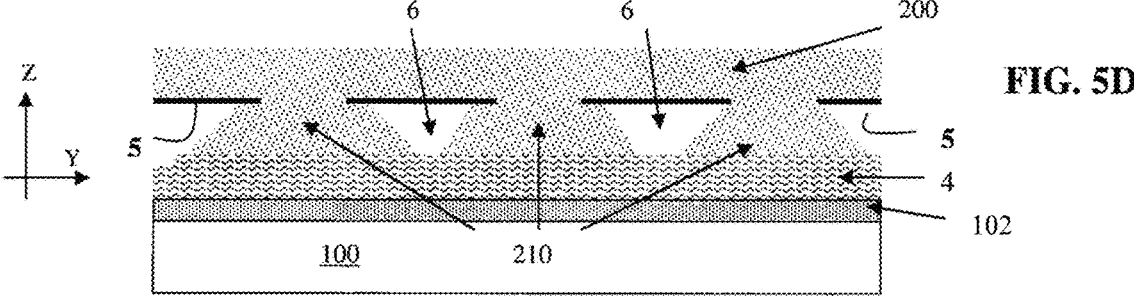

Referring to FIG. 5D, in those portions of the plate 10B where open slots 30B reside, the mortar 200 fills such open slots 30B with a portion of mortar 210 extending out and under the plate 10B at locations corresponding to such slots 30B. In so doing, pillars of mortar 210 reside under the raised portion of the plate 10B and extend between the bottom surface 12 of material 5 of the raised portion of the plate 10B and an exposed upper surface of the underlying mat 4.

The deposited mortar 210 may form mortar pillars of an essentially trapezoidal prism shape or cone shape within these open slots 30B. At select locations (see, e.g., selected mortar 210 in FIG. 5D), or at all locations, the deposited mortar 210 may flow under and spread out underneath the raised portion of the plate 10B with a portion thereof penetrating under and contacting the underside 12 of the plate. The degree to which the mortar 210 spreads out underneath the underside 12 of plate 10 depends on various factors including, but not limited to, the amount of mortar 200 deposited, the amount of pressure applied by an installer during installation of the mortar 200 over plate 10, the viscosity of the mortar 200 used (i.e., degree of mortar wetness), and the like. This penetrating portion of mortar 210 is retained or resides under the support plate 10B in these non-recess 20 regions of the plate to form an interlocking structure of the mortar 200, 210 with the support plate 10B and the underlying mat 4 of the plate 10B.

The mortar 210 between the bottom surface 12 of the raised plate portion and the mat 4 makes direct contact with both the underside of support plate 10B and the upper surface of the mat 4 to form an interlocking bond therebetween. These retained portions of mortar 210 residing under and contacting the underside 12 of the support plate 10B and the mat 4 provide increased or enhanced mechanical bonds between facing materials to the mortar 200 and to both the plate 10B and its underlying mat 4. These pillars of mortar 210 also reduce the amount of empty cavity regions 6 residing between the underside support plate 10B and the mat. Mortar 210 provides the support plates of the invention with increased durability and strength as discussed below, and also aid in more rapid hydration of the cementitious mortar.

The support plates 10B of FIGS. 4A-5D provide additional surface area for the mortar 200 to contact, decrease the area of the empty cavity regions 6 residing between the top of the plate and mat, as well as provide increased durability and strength to the plate by reducing the amount of weak and/or less durable locations or portions of the support plate. Again, this increased durability and strength of the present support plates minimize and/or eliminate stress cracking and delamination of facing materials and/or grout residing over such plates.

Figures 6A, 6B, 6C, 6D:
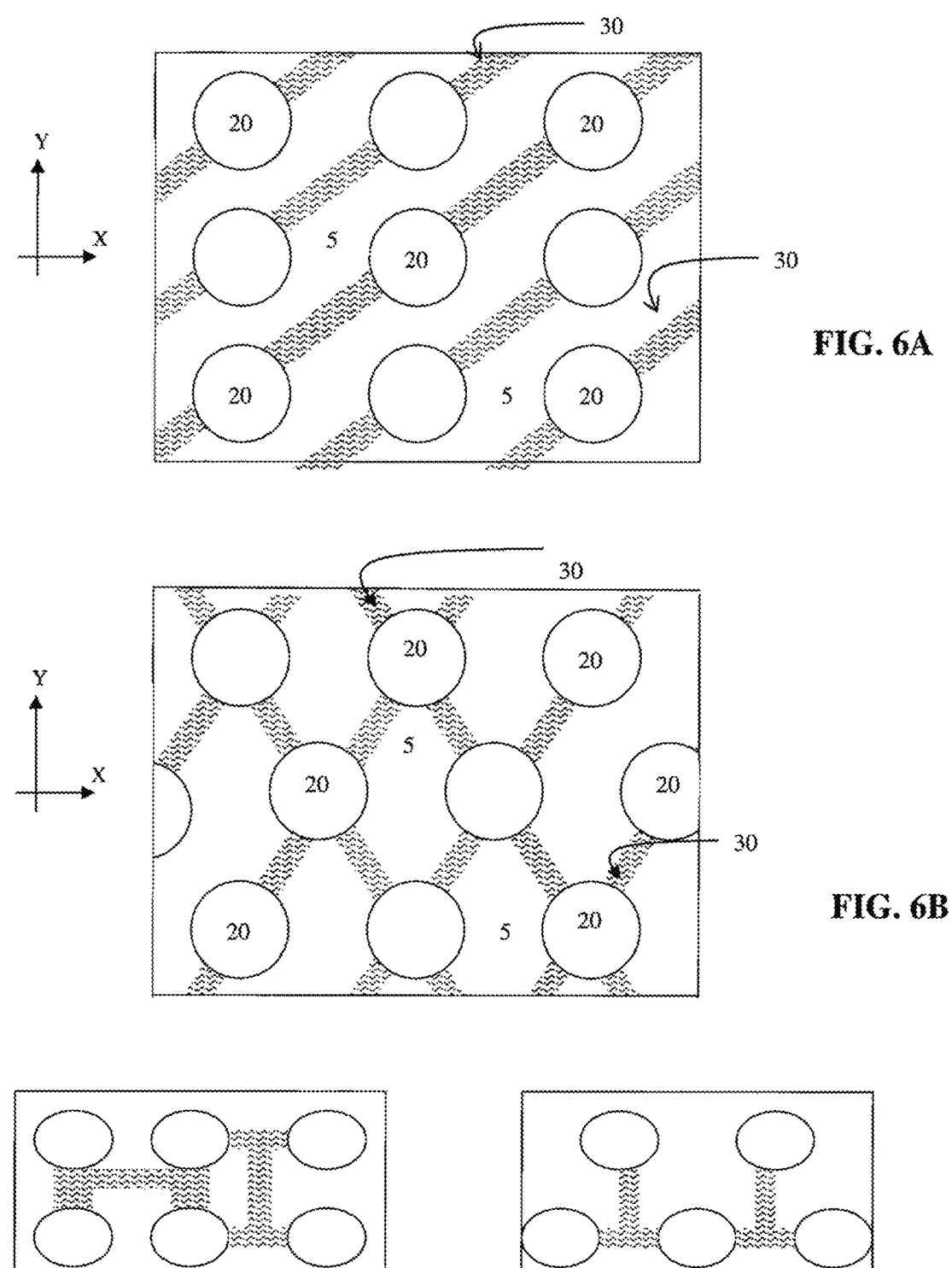
Figure 6E:
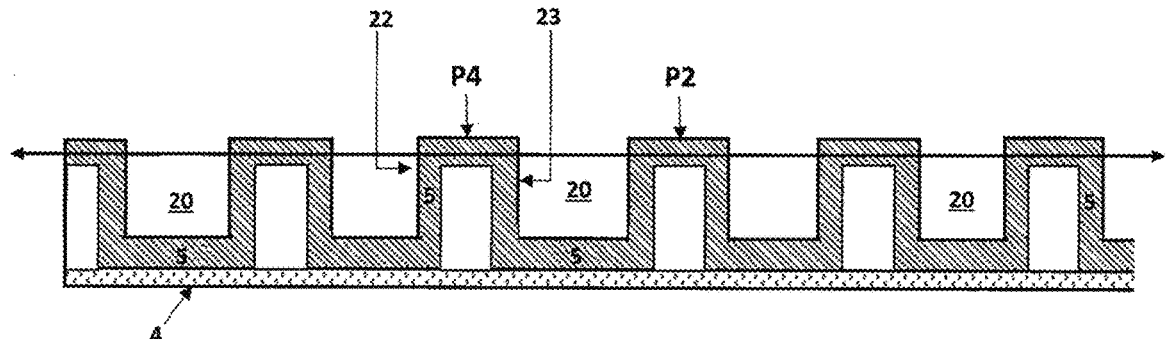
Figure 6F:
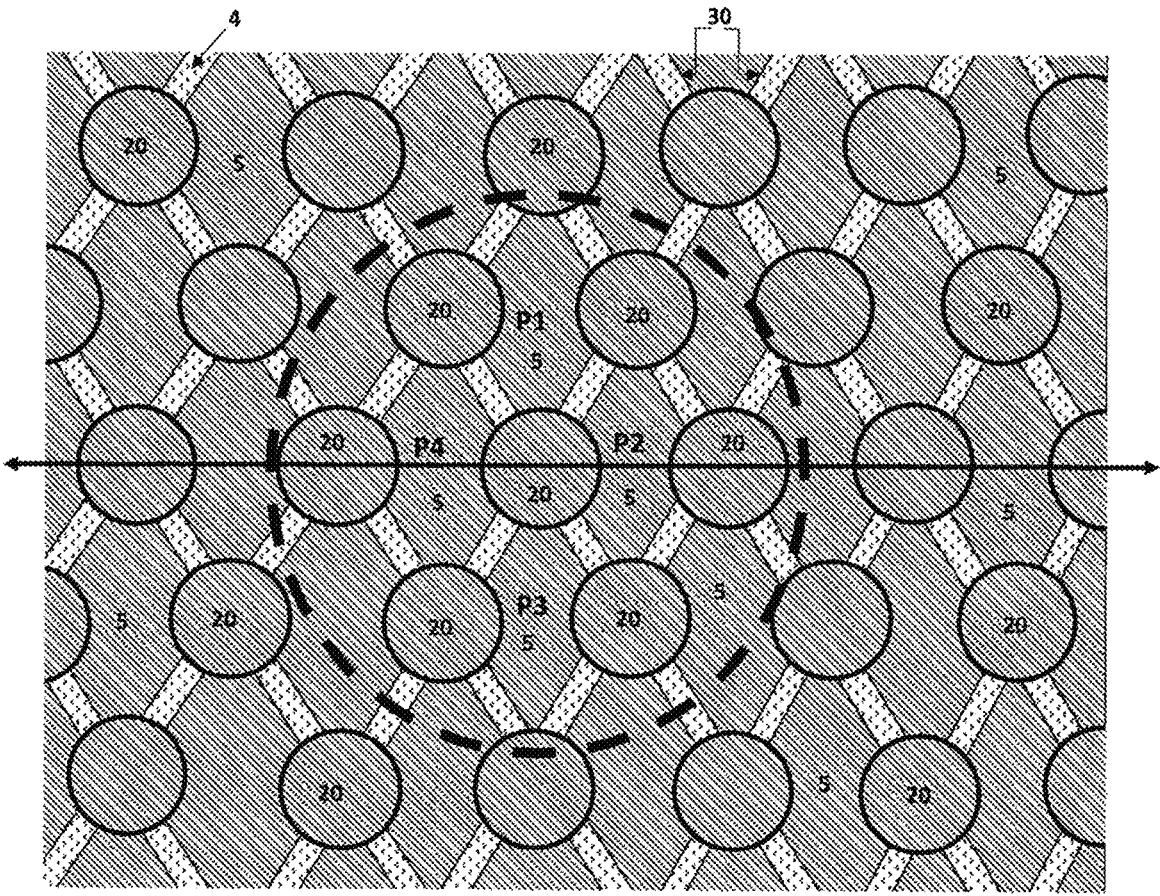
Figure 6G:
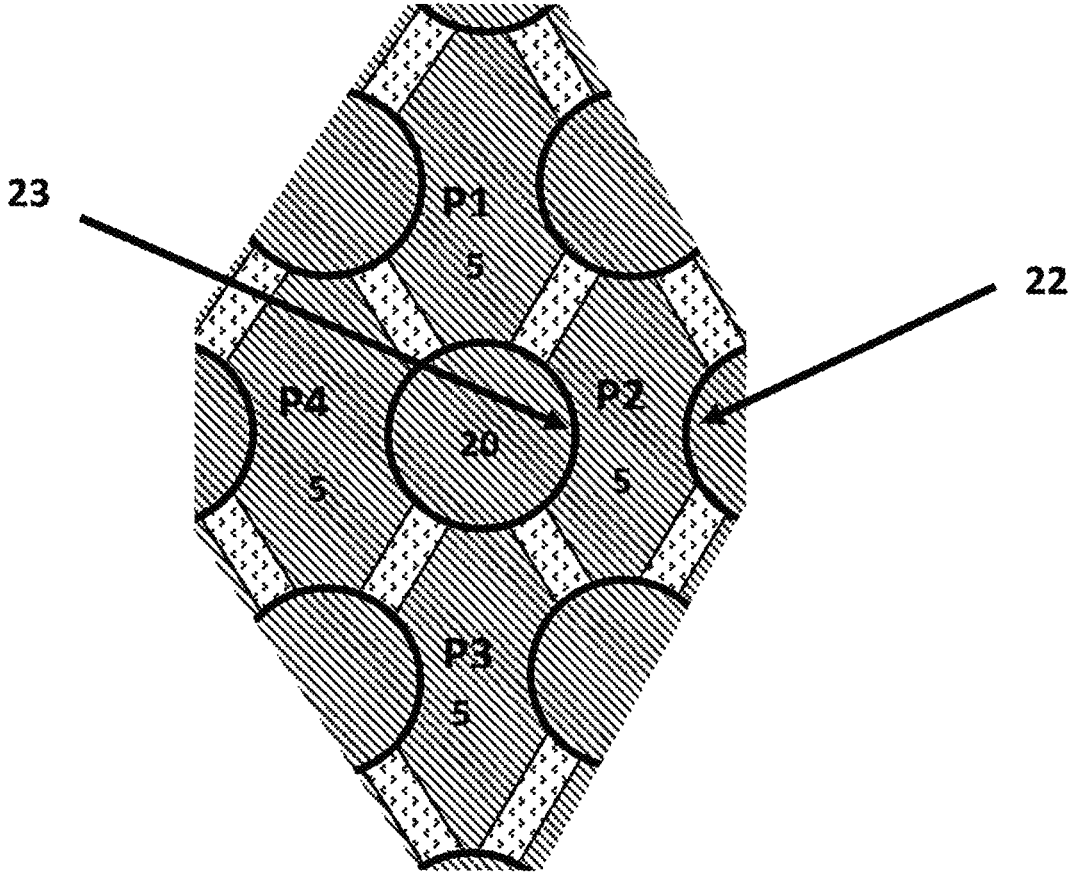

While the invention has been described above in conjunction with various embodiments thereof, it should be appreciated and understood that numerous different support plates may be envisioned within the scope of the present invention. For instance, referring to FIGS. 6A-6D the slots 30, which may be recessed slots, open slots or combinations thereof, may be connected along a variety of paths or planes. These paths may include, for instance, diagonal paths residing in a single plane-direction, or a plurality of crossed lines whether they are diagonal, horizontal or vertical, and whether such crossed lines reside across the entire support plate or just portions thereof. For instance, FIG. 6B is further shown in the enhanced views of FIGS. 6E-6G. As shown in FIG. 6E, the support plate underlayment includes the base sheet material 5 having a first side and second side with the second side being attached, secured, or connected to the mat layer 4. The first side of the base material includes raised portions extending or protruding therefrom to provide a plurality of raised protrusions (see, e.g., protrusions P1, P2, P3, P4, etc. in FIGS. 6E-6G which are exploded drawings of the figures previously described herein). Each protrusion (e.g., P1-P4, etc.) is adjacent recess regions, with each protrusion having a curved outer wall 22 and a curved inner wall 23 and a top surface parallel to the base material. The curved outer and inner walls 22, 23 of each protrusion forms a non-continuous circle due to the open slots 30 (i.e., openings, holes, etc.) residing between recess regions 20. Together the openings 30 and recesses 20 form routing channels or cavities capable of receiving a component, such as, mortar, flooring installation items, and the like. As shown and delineated by the dashed-circle in FIG. 6F, a plurality of routing portions, each comprising a plurality of openings 30, recesses 20, and raised protrusions (e.g., protrusions P1, P2, P3, P4), may reside in rows and columns across the support plate.

It should also be appreciated and understood that the slots 30 within the present support plates are not limited to lines residing along vertical or horizontal paths. Again, referring to FIGS. 7A-7B, such slots 30 may be a plurality of individual perforated slots 30C that reside across the support plate in locations that are adjacent to or between recesses 20 while not contacting such recesses 20. In one or more embodiments, these perforated slots 30C are openings that transverse through the plate material 5 to expose the underlying mat 4.

While the perforated slots 30C in FIGS. 7A-B are shown as circular open perforated slots 30C, it should be appreciated that the perforated slots 30C may have a variety of different shapes and sizes that allow for a sufficient amount of mortar 200, 210 to fill such perforated slots 30C and provide the laid support plate of the invention having increased durability and strength. Shapes of perforated slots 30C not contacting adjacent recesses 20 may include, but are not limited to, circular, square, rectangular, oval, crossed line/slot segment openings, or any other geometrical or polynomial shape, or even combinations thereof. In certain embodiments, the perforated slots 30C may even be of different shapes, dimensions and/or widths on a support plate. However, in each of the embodiments, these perforated slots 30C reside between recesses 20 and do not contact or interfere with these recesses 20.

In still other embodiments of the invention, it should be appreciated that the recesses 20, while shown as circular shapes in FIGS. 2A-7B, are not limited to this shape and may have any desired shape, for example, square, rectangular, oval, any other geometrical or polynomial shape, or even combinations of any of the foregoing. In one or more embodiments, the support plates 10 of the invention may include a combination of two or more staggered shapes. For instance, FIGS. 8A-9B show a combination of circular recess shapes 20 in combination with flared-square recess shapes 21, whereby the circular and flared-square shapes reside in an alternating pattern along both the x-plane and y-plane. Both the circular recesses 20 and the flared-square recesses 21 have planar bottom surfaces and sidewalls for receiving mortar 200.

In accordance with the invention, the various support plates 10 of the invention may have a variety of different thickness', lengths and widths, which are ultimately dependent upon the end use of such support plate. In one or more embodiments, the entire support plate 10 may have a thickness ranging from about 1.5 to 13 mm (about 1/16 to 1/2 inches), preferably from about 1.5 to 3.2 mm (about 1/16 to 1/8 inches). The support plate material 5 may have a thickness of about 0.55 mm, with a tolerance ranging from about 0.3 to 0.7 mm. The underlying mat 4 may be composed of polypropylene spun bond material having a mat weight of about 70 g/sq mt, with a tolerance ranging from about 30-150 g/sq mt. In these embodiments, both recesses 20, 21, etc. and slots 30 (i.e., 30A, 30B, 30C, etc.) may have depths corresponding to the thickness of the support plate 10 (i.e., have depths ranging from about 1.5 to 12.7 mm, preferably from about 1.5 to 3.2 mm). Those slots 30A, 30B contacting and connecting adjacent recesses 20, 21 have lengths corresponding to the distance between such recesses being connected, and may have widths ranging from about 3 to 35 mm, or even more or less. The width of recesses 20, 21 may vary widely depending on the use, and in certain embodiments may have a diameter ranging from about 10 to 65 mm, or even more or less.

Figure 9A:
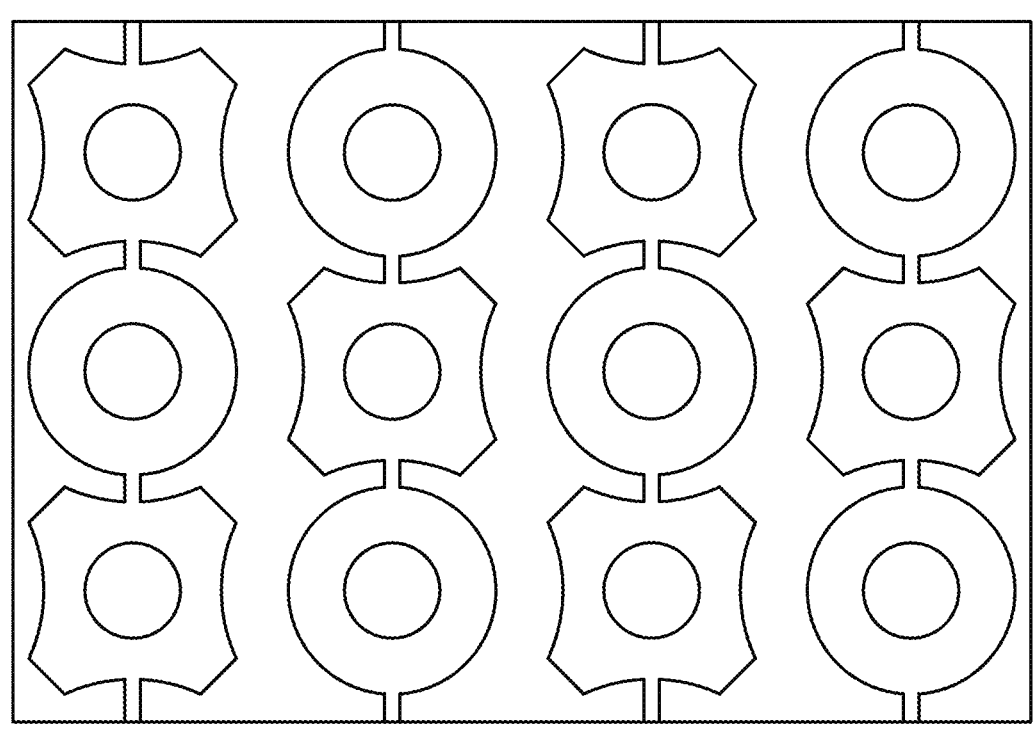
Figure 9B:
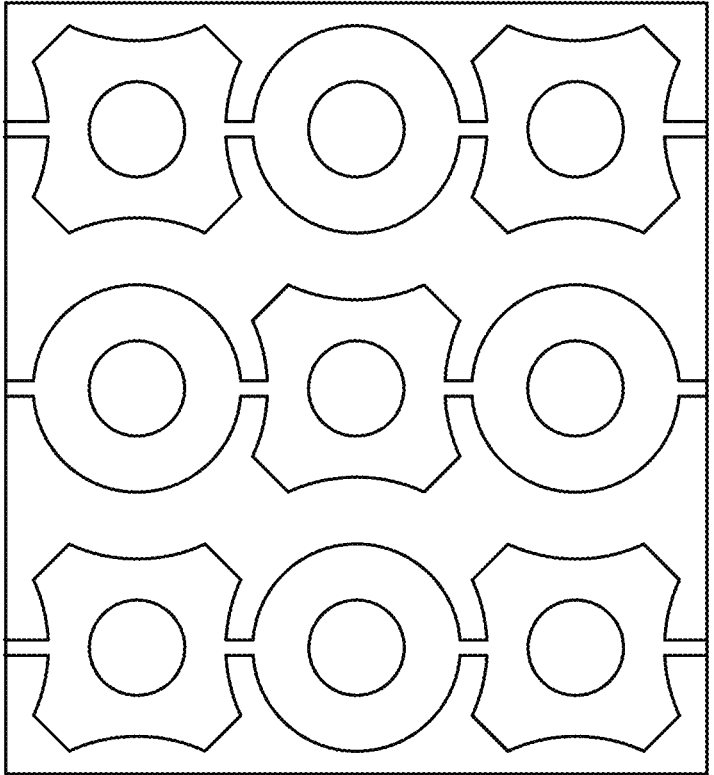

Referring to one or more embodiments of the invention as shown in FIGS. 8A-9B, a support plate 10D is shown having circular recesses 20 in combination with flared-square recesses 21 on a side of the support plate, particularly, alternating circular and flared-square raised portions (see, e.g., FIGS. 9A-9B). Again, these different patterned recesses 20, 21 and different shaped raised portions on the opposite side thereof reside in an alternating pattern across the support plate 10D in both the x-plane and y-plane. Since the flared-square recess shapes take up increased surface area of the plate, as compared to circular recesses alone, an increased amount of mortar 200, 210 is retained within and over the support plate. The support plate 10D of FIGS. 8A-9B may be composed of a high-density polyethylene material 5 having a thickness of about 0.25 mm to about 1.25 mm, preferably about 0.55 mm. The underlying mat 4 may be a polypropylene spun bond material having a mat weight of about 70 g/sq mt, with a tolerance ranging from about 30-150 g/sq mt.

As shown in FIGS. 8A-9B, the support plate 10D may have a depth or thickness ranging from about 1.5 to 13 mm, preferably from about 1.5 to 3.2 mm, and most preferably about 2.75 mm, with the recesses 20, 21 also have depths corresponding to (or the same as) the support plate 10D. The diameter of the circular recesses 20 may range from about 5 to 60 mm (or more or less), preferably from about 13 to 35 mm, and most preferably about 20 mm. The diameter of the flared-square recess 21 residing along the diagonal thereof (i.e. at its largest diameter) may range from about 5 to 70 mm (or more or less), preferably from about 13 to 63 mm, and most preferably about 28 mm, with the smaller inner portion of such flared-square recesses having diameters corresponding to its diagonal diameter.

The center from one circular recess 20 to the center of an adjacent flared-square recess 21 may have a length ranging from about 6 to 75 mm (or more or less), preferably from about 11 to 66 mm, and most preferably about 26 mm. The open slots 30A each have a length corresponding to the distance between the outer edge of one recess 20 to the outer edge of the adjacent recess 21 for which such open slot 30A makes a connection between. That is, the open slots 30A each have a length corresponding to the distance between adjacent recesses 20, 21 that the slot 30A connects together. The width of the open slots 30A may range from greater than 0 mm up to about 50 mm (or more or less), preferably from about 3.5 to 25 mm, and most preferably about 4.5 to 9 mm. While the foregoing provides ranges for the width of the slots 30 (i.e., 30A, 30B, 30C, etc.) of the invention, it should be appreciated that such slots 30 may have a width that corresponds to the size of the recesses 20, 21 that are being adjoined by such slots 30.

Example 1

Support plate in accordance with one or more embodiments of the invention as shown in and described above in connection with FIGS. 8A-9B (e.g., the most preferred embodiment thereof) was installed over a 48"×59" plywood base. The plywood base was a 23/32" Exposure 1 T&G plywood subfloor adhered to and nailed to four 2"×2" joists spaced 19.2" O.C. (on center). A thin-set mortar 102 mixed with water was troweled over the plywood subfloor with a 1/4"×3/16" V-notched trowel using known application techniques. A support plate 10D of the invention was laid into the thin-set and smoothed with a grout float and rolled with a 35 pound roller to eliminate air pockets. The system was then allowed to cure for 24 hours.

A thin-set mortar 200 mixed with water was deposited over the support plate 10D of the invention using a 1/4"×3/8" square-notched trowel. During the installation, the mortar 200 was applied in a sufficient amount and with both sufficient pressure and care to ensure that the mortar 200 filled recesses 20, 21 and filled the open slots 30A to form mortar pillars 210 residing underneath the backside 12 of the plate 10D materials. A plurality of 12"×12" porcelain tiles were set in the thin-set by pressing down and sliding the tiles in a direction perpendicular to combed ridges of the mortar 200. After the tiles were installed, the thin-set mortar 200, 210 was allowed to cure for 24 hours before grouting.

A water-based grout was forced into the 1/8" grout joints using a rubber float, and excess grout was removed. The grout was allowed to set for approximately 20 minutes before the installation was cleaned with a sponge and water. The grouted installation was subsequently allowed to cure for 28 days.

At the end of this cure period, the installed system was subjected to load cycling as defined in ASTM C627. The deflection of the plywood subfloor was measured in the wheel path, midway between the 19.2" O.C. joists. The installed system completed all fourteen cycles with no evidence of damage to the tile or grout joints. The maximum deflection of the plywood subfloor during cycling was approximately 0.053". All evaluation criteria were based on 8 tiles and 8 grout joints in the wheel path of the Robinson-Type Floor Tester. In accordance with the Performance Level Requirement Guide and Selection Table of the 2012 *TCNA Handbook for Ceramic, Glass, and Stone Tile Installation* (page 31), the tested installed system of the invention is classified as "EXTRA HEAVY".

Example 2

Support plate like that implemented in Example 1 was installed over a 48"×49.5" plywood base. The plywood base was a 23/32" Exposure 1 T&G plywood subfloor adhered to and nailed to four 2"×2" joists spaced 16" O.C. Mortar 102, support plate 10D, thin-set mortar 200, tiles and grout were all installed as described in connection with Example 1 above.

At the end of the grout cure period, this installed system was subjected to load cycling as defined in ASTM C627. The deflection of the plywood subfloor was measured in the wheel path, midway between the 16" O.C. joists. The installed system completed all fourteen cycles with no evidence of damage to the tile or grout joints. The maximum deflection of the plywood subfloor during cycling was approximately 0.031". All evaluation criteria were based on 8 tiles and 8 grout joints in the wheel path of the Robinson-Type Floor Tester. In accordance with the Performance Level Requirement Guide and Selection Table of the 2012 *TCNA Handbook for Ceramic, Glass, and Stone Tile Instal-lation* (page 31), the tested installed system of the invention is classified as "EXTRA HEAVY".

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A support plate for installing facing materials on a substrate consisting essentially of:
   a single layer plastic sheet material having a first side and a second side;
   raised portions residing across the first side of the single layer plastic sheet material, the raised portions are a plurality of raised protrusions with each of the plurality of raised protrusions having a curved outer wall form-ing a non-continuous circle, a curved inner wall form-ing a non-continuous circle, and a top surface being the single layer plastic sheet material;
   a plurality of adjacent recesses residing across the first side of the single layer plastic sheet material;
   a plurality of recessed slots residing across the first side of the single layer plastic sheet material, each recessed slot having slot sidewalls and a slot surface being the sheet material; and
   an underlay mat of non-woven fabric material having an underlay mat first side bonded to the second side of the single layer plastic sheet material and an underlay mat second side that is only the non-woven fabric material of the underlay mat;
   wherein each recess of the plurality of recesses is con-nected to three or more adjacent recesses on the single layer plastic sheet material, respectively, via three or more separate recessed slots of said plurality of recessed slots.

2. The support plate of claim 1 wherein the plurality of recessed slots extend partially into the sidewalls of the recesses at the first side of the single layer plastic sheet material.

3. The support plate of claim 1 wherein the raised portions are a plurality of spaced apart adjacent raised portions.

4. The support plate of claim 1 wherein the plurality of adjacent recesses are a single shape.

5. The support plate of claim 1 wherein the plurality of adjacent recesses are two or more different shaped recesses.

6. The support plate of claim 1 wherein each of the plurality of recesses is open at the top and has a bottom and sidewalls of the sheet material.

7. A support plate for installing facing materials on a substrate consisting essentially of:
   a single layer plastic sheet material having a first side and a second side;
   raised portions residing across the first side of the single layer plastic sheet material;
   a plurality of adjacent recesses residing across the first side of the single layer plastic sheet material;
   a plurality of recessed slots residing across the first side of the single layer plastic sheet material, each recessed slot having at least slot sidewalls being the sheet material;
   wherein each recess of the plurality of recesses is con-nected to three or more adjacent recesses on the single layer plastic sheet material, respectively, via three or more separate recessed slots of said plurality of recessed slots;
   an underlay mat of non-woven fabric material having an underlay mat first side bonded to the second side of the single layer plastic sheet material and an underlay mat second side that is only the non-woven fabric material of the underlay mat; and
   wherein the first side of the single layer plastic sheet material is an open top side of the support plate, the first side having a plurality of routing regions residing on the single layer plastic sheet material defined at least by the raised portions and recesses and being exposed by the open top side of the support plate, wherein one or more of the plurality of routing regions at the open top side of the support plate are adapted to receive a component therein.

8. The support plate of claim 7 wherein the plurality of routing regions are arranged in rows and columns on the first side of the single layer plastic sheet material.

9. The support plate of claim 7 wherein the component received in the plurality of routing regions is a flooring installation item.

10. A support plate for installing facing materials on a substrate consisting of:
   a single layer plastic sheet material having a first side and a second side;
   raised portions residing across the first side of the single layer plastic sheet material, the raised portions are a plurality of raised protrusions with each of the plurality of raised protrusions having a curved outer wall form-ing a non-continuous circle, a curved inner wall form-ing a non-continuous circle, and a top surface being the single layer plastic sheet material;
   a plurality of adjacent recesses residing across the first side of the single layer plastic sheet material;
   a plurality of recessed slots residing across the first side of the single layer plastic sheet material, each recessed slot having at least slot sidewalls being the sheet material; and
   an underlay mat of non-woven fabric material having an underlay mat first side bonded to the second side of the single layer plastic sheet material and an underlay mat second side that is only the non-woven fabric material of the underlay mat;
   wherein each recess of the plurality of recesses is con-nected to three or more adjacent recesses on the single layer plastic sheet material, respectively, via three or more separate recessed slots of said plurality of recessed slots.

11. The support plate of claim 10 wherein the plurality of recessed slots extend partially into the sidewalls of the recesses at the first side of the single layer plastic sheet material.

12. The support plate of claim 10 wherein the first side of the single layer plastic sheet material is an open top side of the support plate, the first side having a plurality of routing regions residing on the single layer plastic sheet material defined at least by the raised portions and recesses and being exposed by the open top side of the support plate, wherein one or more of the plurality of routing regions at the open top side of the support plate are adapted to receive a component therein.

13. The support plate of claim 12 wherein the plurality of routing regions are arranged in rows and columns on the first side of the single layer plastic sheet material.

14. The support plate of claim 12 wherein the component received in the plurality of routing regions is a flooring installation item.

15. The support plate of claim 10 further consisting of the raised portions being a plurality of raised protrusions with each of the plurality of raised protrusions having a curved outer wall forming a non-continuous circle, a curved inner wall forming a non-continuous circle, and a top surface being the single layer plastic sheet material.

* * * * *